(12) United States Patent
Chaudhari et al.

(10) Patent No.: US 7,103,351 B2
(45) Date of Patent: Sep. 5, 2006

(54) POLICY SERVICE SYSTEM AND METHODOLOGY

(75) Inventors: Ambarish Chaudhari, Karnataka (IN); Amod Kashikar, Maharashtra (IN); Ramesh Varma, Andhra Pradesh (IN); Padma Priya Gopalan, Tamilnadu (IN); Sachin Smotra, Jammu And Kashmir (IN); Jyothirmoy Chakravorthy, Karnataka (IN); Rajesh T S Reddy, Karnataka (IN)

(73) Assignee: July Systems Inc., Santa Clara, CA (US)

( * ) Notice: Subject to any disclaimer, the term of this patent is extended or adjusted under 35 U.S.C. 154(b) by 0 days.

(21) Appl. No.: 10/601,397

(22) Filed: Jun. 23, 2003

(65) Prior Publication Data

US 2004/0259534 A1   Dec. 23, 2004

(51) Int. Cl.
*H04M 11/00* (2006.01)
*H04M 3/00* (2006.01)
*G06F 17/60* (2006.01)

(52) U.S. Cl. .............. 455/414.1; 455/414.3; 455/406; 455/419; 705/34; 705/26; 705/40

(58) Field of Classification Search ............ 455/414.1, 455/419, 414.3, 406, 411; 705/26, 34, 40, 705/44
See application file for complete search history.

(56) References Cited

U.S. PATENT DOCUMENTS 5,754,772 A * 5/1998 Leaf ..................... 709/203
6,047,051 A * 4/2000 Ginzboorg et al. ......... 379/130
6,829,474 B1 * 12/2004 Adachi .................. 455/414.1
2002/0007462 A1 * 1/2002 Omata ...................... 713/202
2004/0043753 A1 * 3/2004 Wake et al. ............... 455/406
2004/0203630 A1 * 10/2004 Wang .................... 455/414.1

OTHER PUBLICATIONS

Telecommunications in Modern Satellite; Cable and Broadcasting Services, 1999. 4th International Conference on vol.: 2, Oct. 13-15, 1999 p. 677-680 vol. 2.*

* cited by examiner

*Primary Examiner*—George Eng
*Assistant Examiner*—Wesley Kim
(74) *Attorney, Agent, or Firm*—William L. Botjer

(57) ABSTRACT

The present invention provides for creation, relevance based discovery and delivery of services to mobile users over telecommunications networks. The services are provided on a Mobile Service Provider's (MSP's) network infrastructure and created in collaboration with third parties by means of service objects. Each service object is a three dimensional collection of service capabilities derived from the network infrastructure, service elements and assets like user billing relations, user profiles, device capability and location. The service capabilities address and factor in network facing, subscriber facing and third party requirements of service delivery. Service objects can be configured for different service and business priorities of the operator such as DRM and location services. A service object extends all MSP assets to third parties in a regulated manner. The user can discover relevant services, subscribe to, and personalize the services. The users receive a consolidated bill for the services they have used periodically.

22 Claims, 9 Drawing Sheets

POLICY SERVICE SYSTEM AND METHODOLOGY

BACKGROUND

The present invention relates broadly to a novel method for providing services to mobile users. More specifically, the present invention relates to the creation, relevance based discovery and delivery of services over mobile networks In typical wireless networks, a mobile service provider is the owner of the shared network infrastructure. The third party service providers (also referred to as "application providers" or "content providers" or "third parties") are in partnership with the mobile service provider. The third parties use their network infrastructure in order to provide services to the mobile users.

The traditional wireless networks, which use the model of one network, one device and one application (service) provided by mobile service providers, have been used for a long time. However, today's wireless landscape is rapidly changing. The advent of high-speed networks in today's wireless landscape presents a diversity of challenges. Such high-speed networks are capable of supporting technologies that provide new advanced services, support full-feature devices and adjust to changing subscriber trends. Indeed, there is a huge scope for maximizing the utilization of the capabilities of such wireless networks on these counts.

On the third party end of the mobile service delivery chain, diverse third parties from different non-telecom domains, have started making inroads into the mobile service delivery chain in order to maximize the utilization of the present wireless landscape. However, these third parties face a constraint. Many of these third-parties do not possess all the capabilities required for end-to-end service delivery. For example, an entertainment company may own music content that it wants to deliver onto mobile devices, but it has neither any direct subscriber billing relationships nor capabilities to enforce Digital Rights Management (DRM).

On the subscriber end of the mobile service delivery chain, the diversity of subscriber requirements and devices is on a rise. Clearly, this requires mobile service providers to gear up to offer multiple services for different subscribers with different devices. These services must be customized in order to match the device capabilities. Hence, the mobile service providers need to address the requirements of the subscriber to personalize services. Also, the users must be able to easily access relevant services based on their profile, location, preferences, current status and the like.

Since there are so many diverse services that are being offered to varied types of subscribers, another major issue that needs to be addressed is the lack of a system that can enable integrated subscriber management and billing. Another major issue is the long time frames taken by existing systems for service creation. In the growing competitive nature of service delivery, services must be created much faster than what is being used currently (the current time frame is of few months), to gain an edge over the competitors.

Besides the abovementioned issues relating to incomplete usage of capabilities of today's high-speed networks, there is another area wherein the capacities are not utilized to the maximum. This area is incomplete utilization of Mobile service providers. Mobile service providers in the mobile service delivery chain have a unique asset: they have the ownership of the subscriber database. To build their position as a central hub in the service delivery value chain, mobile telecom operators need to reposition themselves from being merely telecom service providers (providing the transport pipe between applications and devices) to become smart, value-adding intermediaries in service delivery.

In the light of the abovementioned disadvantages, there have been some solutions that attempt to overcome the limitations of traditional methods for service creation. "Service Creation System (SCS)" made by Alopa located in California, USA is one such solution. The Alopa SCS provides a comprehensive framework for enabling rapid creation and deployment of new broadband services within the provider infrastructure. It allows broadband service providers to quickly deploy new revenue generating and differentiated levels of services, spanning voice, data and video. The SCS also improves the providers' business processes by centrally integrating multiple billing, customer care and trouble-ticketing systems.

Another system for service creation is "Wireless Service Builder" by Maskina located in Massachusetts, USA. Wireless Service Builder (WSB) consists of an internal portal for mobile service providers' management of mobile services and web-based environment for service creators. It also consists of a runtime environment and application server for the mobile services and a choice of mobile deliveries for browsing and using mobile services. A set of platform modules is available for the different creator groups, including content providers, users, large enterprises, media companies, marketers, service providers, systems integrators and the mobile service provider's internal resources. Services are created using simple web-based step-by-step templates that guide the creator through the creation process.

Yet another service is "Telecommunications Service Creation Environment (TSCE)", by Compaq located in California, USA. The suite of services offered by TSCE aid service creation by mobile service providers as well as third parties. Services are created using Graphical User Interface (GUI) templates. Using GUIs, which correspond to the service objects, makes the service creation easier and faster. TSCE can provide customized services too.

Also "Telcordia SPACE Service Creation & Provisioning System", made by Telcordia Technologies located in New Jersey, USA, provides one approach. This service, involves service creation by mobile service providers as well as third party participants. The service creation is done through templates, which have already been developed by mobile service providers. Once the mobile service provider implements the service, the users of the service can customize the service according to their own requirements.

A patent application overcoming some of the problems of traditional system of service creation is WO0217105A1 entitled "System And Method For On-Line Service Creation" published on Jul. 27, 2001 by Pure Matrix, Inc., Colorado, United States of America. The disclosure apparently provides an online platform accessible to the content providers at one end and the users at the other. The users can customize the created services according to their requirements. The disclosed invention provides these service creation capabilities for various network devices that may have either wired or wireless connectivity to the platform.

The existing methods to overcome the limitations inherent in traditional methods for service creation still do not solve the problem entirely. The traditional methods of service creation fail to effectively and profitably use information about mobile service provider network capabilities, applications enabling services, user device capabilities and the existing business relationships with third parties. The facility of the mobile service provider mediating at the application level relationship between the user and partner is also not available. Further, traditional service creation methods are not policy-based. There is also a need for improved collaboration between third parties and mobile service providers for service creation. For instance, traditional service creation methods often do not have information about the target user profile at the time of service creation, which would have helped them to create a more customized service.

Also, in existing methods, the user often does not have the option of customizing and/or personalizing the services as per the user's needs. Moreover, there is no relevance based service provision. In other words, the user gets to know all the services that are being provided irrespective of the fact that some of these services may not at all be relevant to the user.

Thus, there is need for an invention that creates a service framework to incorporate mobile service provider network capabilities, user profile and device capabilities, application enabling services and business relationships that the operator has with its two ends (i.e. "users" and "third parties") together while creating services. There is a need for an invention that can profitably use the mobile service provider's core network information to create services. Further, there is a need for an invention that allows the third party to participate in the service creation process to customize services according to user requirements.

SUMMARY

The features and advantages as described in this summary and the following detailed description are not all-inclusive, and particularly, many additional features and advantages will be apparent to one of ordinary skill in the art in view of the drawings and specifications.

An aim of the invention is to provide a method and system of creation, discovery and delivery of service wherein the mobile service provider and third parties collaboratively create and deliver the service.

Another aim of the invention is to enable the mobile service provider to profitably use information such as the user location and device capability, present at the mobile service provider core network.

Yet another aim of the invention is to enable mobile service providers in partnership with the third parties to provide value added services, such as identity federation and rights management, while providing services to the users.

Yet another aim of the invention is to enable the mobile service provider to apply required network-level controls and intermediate application-level relationships based on third party's applications.

Yet another aim of the invention is to enable the customization of services that are being delivered to the user at the time of creation of services.

Yet another aim of the invention is to enable the user to customize services being delivered to him/her as per user preferences.

Yet another aim of the invention is to enable a consolidated billing to the user for all the services that the user has availed.

Yet another aim of the invention is to provide a system to create Service Objects that allow the operator to quickly and easily roll-out services in collaboration with multiple third party applications and shared content with third party, using flexible charging mechanisms.

Yet another aim of the invention is to enable the user to get services that match the user profile and are relevant.

In order to attain the above-mentioned aims, the present invention enables service creation by collaborative participation between a mobile service provider and third parties. These services are then offered to mobile users through a network infrastructure owned by the mobile service provider and shared by the third parties as per the business relationships between the mobile service provider and the third parties. The mobile service provider creates a service object incorporating business relationships and network capabilities. A service object is a pre-packaged, easy to incorporate service creation and delivery solution that encompasses all the technical and business level capabilities required to deploy, deliver and charge for a specific category of service. The created service object is based on a model having a combination of a particular set execution flows. In a preferred embodiment of the present invention, service creation is carried out by the third party with the help of predefined service objects stored with the mobile service provider. The third party according to the kind of service fills in the service object parameters that it wishes to provide to the user. The services thus created by the third party are offered to the user of mobile devices.

These services offered to the user only when they are relevant to the user. Relevance is determined on the basis of mobile service provider core network information.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention is a business method for creation, discovery and delivery of various types of services to mobile users. A service provider (also referred to as "partner" and "third party") provides these services through a shared network infrastructure. A network mobile service provider (also referred to as operator) owns the shared network infrastructure. One or more third parties share the network infrastructure to offer their services to users.

Figure 1:
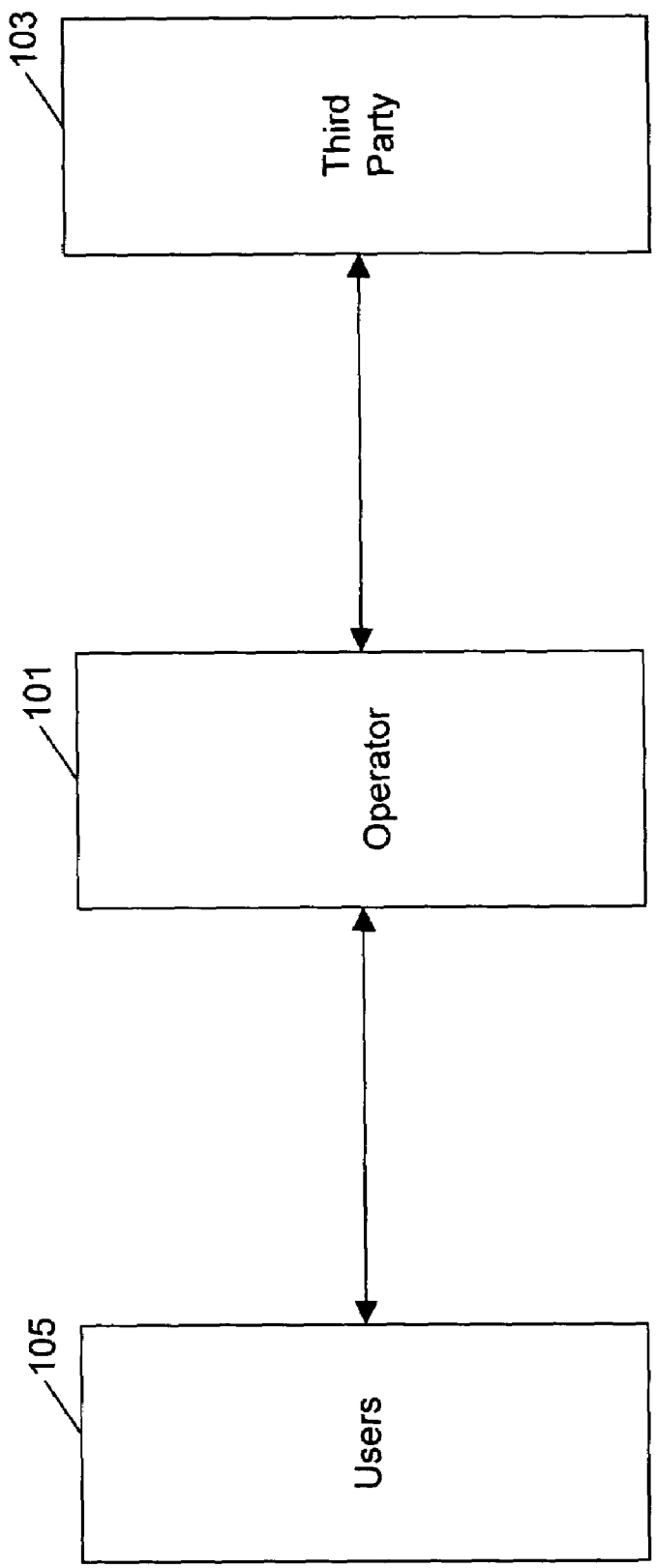
FIG. 1 shows the environment in which a preferred embodiment of the present invention operates.

FIG. 1 shows the environment in which a preferred embodiment of the present invention operates. FIG. 1 shows a mobile service provider 101, a third party 103 and a user 105. Note that, for the sake of illustration, only a single third party 103 and only a single user 105 is shown in FIG. 1. There may be a number of third parties and users that share the network infrastructure of mobile service provider 101. User 105 is a subscriber of services offered by a partner (third party 103) of mobile service provider 101. User 105 can be a mobile user and hence, wireless connectivity is required for provision of services to a mobile user. Wireless connectivity is often provided through the shared network infrastructure owned by mobile service provider 101. Thus, mobile service provider 101 acts as an intermediary between third party 103 and user 105.

Figure 2:
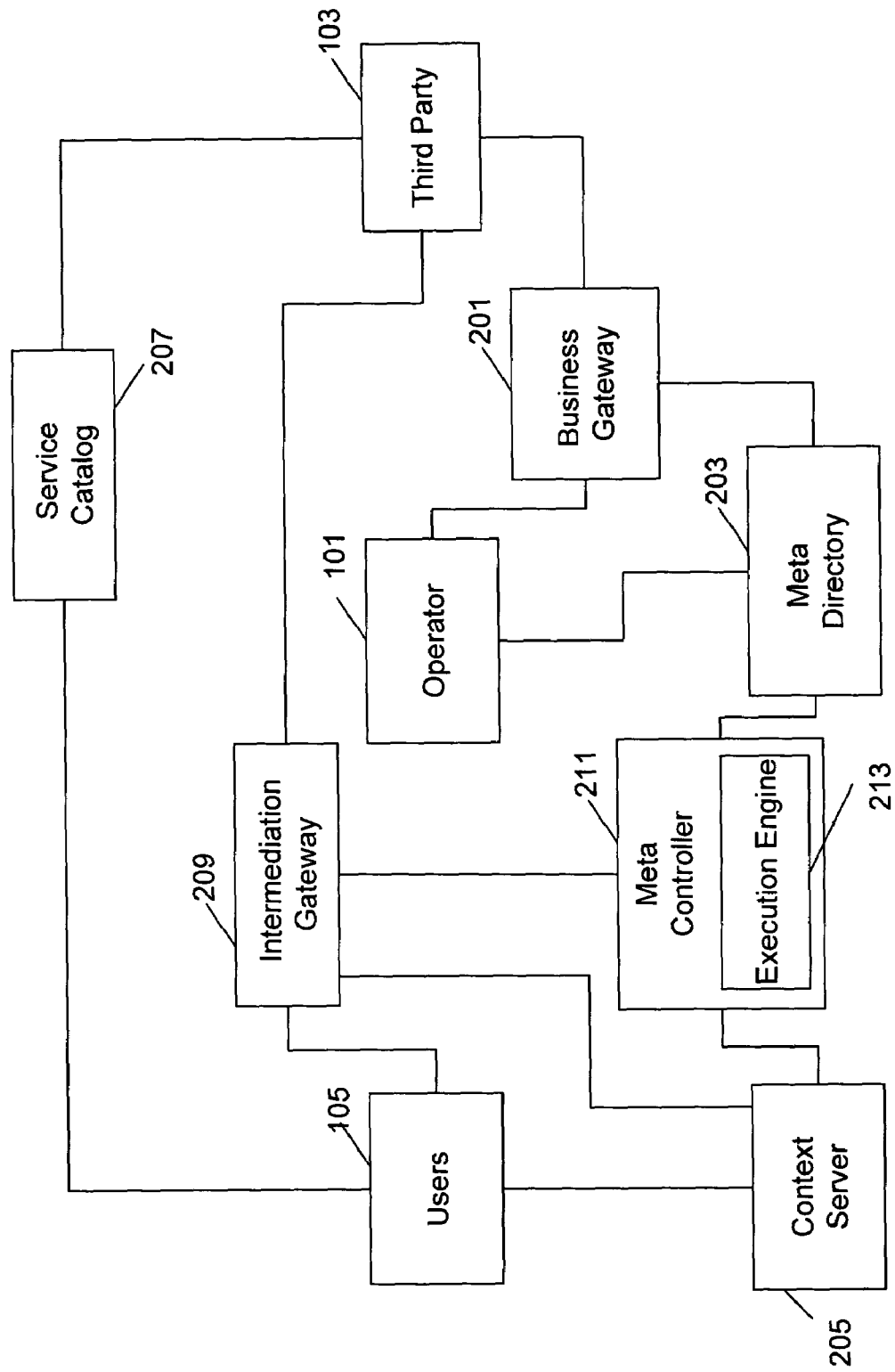
FIG. 2 shows the system components by which the service is created and implemented.

FIG. 2 is a block diagram that illustrates the system components by which the service is created and delivered over the network infrastructure. System components that enable the creation and delivery of services include a Business Gateway 201, a Meta Directory 203, a Context Server 205, a Service Catalog 207, an Intermediation Gateway 209, a Meta Controller 211 and an Execution Engine 213.

Business Gateway 201 acts as an interface for information exchange between mobile service provider 101 [Meta Directory 203], and third party 103 and vice versa. Business gateway 201 exposes only the authorized features to third party 103 for collaborative service creation. Third party 103 can publish application descriptors (like Java Application Descriptor (JAD), OMA (Open Mobile Alliance), Content Object Descriptor (COD), Web Services Description Language (WSDL) and the like that enable features such as end users designing and developing applications, listing services on the web and upgrading capacity on demand) and business descriptors like relevance, charging information, DRM, security and 'context' permissions through Business Gateway 201. Meta Directory 203 is a repository for information storage. The information stored is used for making service objects (explained later in this section), service creation and system control. To achieve these functionalities, information such as details about users, network infrastructure and network capabilities, business relationships and service definitions is stored in Meta Directory 203. Context Server 205 collects information from the whole system. This information includes information about users 105, mobile devices that may be used by users 105, and various other components of the network infrastructure.

Service Catalog 207 contains a list of all the services that are being offered by all third parties sharing the network infrastructure and their corresponding relevance criteria. Relevance criteria are used by Service Catalog 207 to present the most relevant services to user 105. This is achieved by matching the relevance criteria with the user context information. Intermediation Gateway 209 enables intermediation at the application level during run time by assigning the appropriate application for a requested service during service delivery. Further, it also helps in enforcing policies, corresponding to a service, on the selected application enabling the service. Meta Controller 211 controls all the elements of the system and also enables user authentication and authorization. Meta Controller 211 controls all the network elements by implementing policies. Meta Controller 211 has Execution Engine 213 that decides on the execution flow or logic based on a requested service. An execution flow governs the run time behavior or execution of a service. A detailed description of all the aforementioned system components is provided below.

Business Gateway 201 provides interfaces to third party 103 to create services. Business Gateway 201 aids collaboration between mobile service provider 101 and third party 103 for service creation. Business Gateway 201 authenticates third party 103 for usage of information provided by mobile service provider 101 as per business relationships between mobile service provider 101 and third party 103. It also provides third party 103 with the service objects created by mobile service provider 101. Use of Business Gateway 201 for service creation and discovery is explained later in greater detail.

Figure 3:
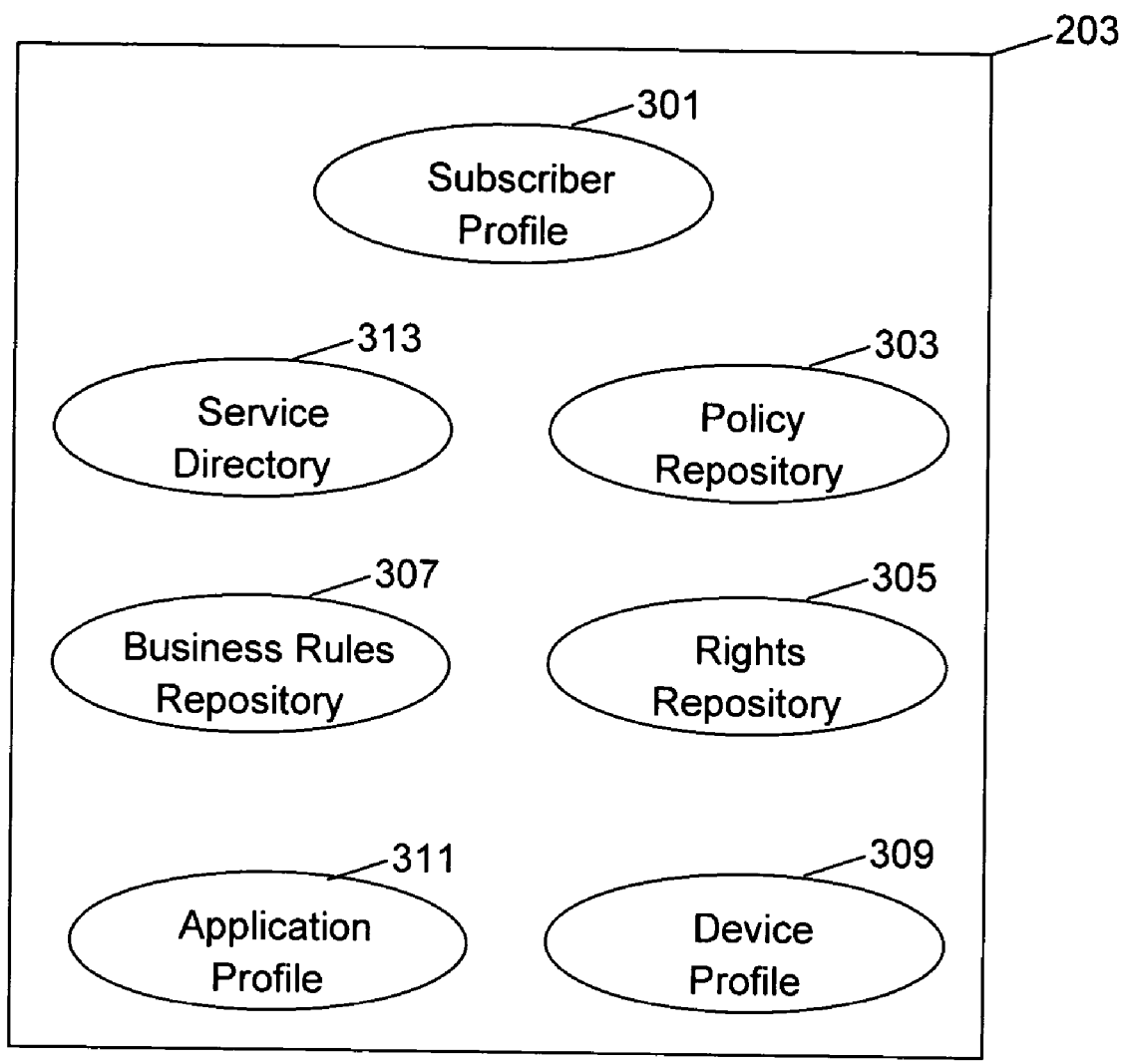
FIG. 3 is a block diagram that describes a Meta Directory in accordance with a preferred embodiment of the present invention.

FIG. 3 is a block diagram that describes Meta Directory 203 in accordance with a preferred embodiment of the present invention. Meta Directory 203 stores information about the entire system. The information includes Subscriber Profile 301 that stores information about users 105. Subscriber Profile 301 may have user information such as user age, gender, address, date of expiry of subscription and the like. Policy Repository 303 stores the various policy rules as defined by mobile service provider 101. These policy rules are based on the network capabilities of mobile service provider 101. Rights Repository 305 stores the various service rights as defined by mobile service provider 101. Service rights help the mobile service provider to control usage of the available resources like digital content during service delivery. Mobile service provider 101 uses these policies and rights for building service objects. These policies are also used by Meta Controller 211 to control the network elements (as will be explained later). The process of defining policies and rights is shown in conjunction with FIG. 5.

Business Rules Repository 307 stores rules defined by mobile service provider 101 based on the business relationship between mobile service provider 101 and third party 103. The policy rules and business rules are chosen to create service objects. Business relationships are agreements between mobile service provider 101 and third party 103 for enabling services as required by third party 103. These relationships may include providing network capabilities to third party 103 as defined by mobile service provider 101. This, in turn, helps network level controls by mobile service provider 101 on the basis of third party 103 services. Business relationships may also include sharing of user contextual information without explicitly revealing user identity. Further, mobile service providers can introduce value added services along with the existing services based on business relationship with third party 103.

Device Profile 309 contains detailed information about the various devices possessed by users 105. Device information includes details about the possible devices user 105 can possess such as kind of device (e.g. palm top, lap top, mobile handset) and the kind of services that can be enabled on the device (e.g. MMS, SMS, WAP). Application Profile 311 contains all information of the various kinds of descriptors (such as Java™2 Micro Edition (J2ME), COD, Open Mobile Alliance (OMA), etc.) of applications (such as HTTP, Session Initiation Protocol (SIP), dial-up, etc.) that are used for implementation of services. Service Directory 313 contains service objects as defined by mobile service provider 101. Service objects may be used to enable different functionalities like Internet access and downloading.

Context Server 205 is used to collect information about user 105, user's identities and states [e.g. connected, authenticated, disconnected] vis-à-vis mobile service provider's network infrastructure and application preferences. User information like user device type and current location is accompanied with user request. This information includes data such as user's current location, authentication state and IP address. Context server 205 queries this information from network infrastructure using standard interfaces (e.g. location server, GPRS Gateway Support Node (GGSN)). User 105's relationship with applications is collected via service subscription and/or personalization.

Service Catalog 207 stores a list of created services and relevance criteria corresponding to the created services. Third party 103 defines the relevance criteria. Relevance criteria for each service are specified in the terms of variables as filled by the third party. Service Catalog 207 displays the most relevant services to user 105. Service Catalog 207 matches the relevance criteria of all the services with the user contextual information. User contextual information is collected from Context Server 205. The services for which their corresponding relevance criteria match the user contextual information are offered to user 105. The concept of service discovery is explained in greater detail later in the application.

Figure 4:
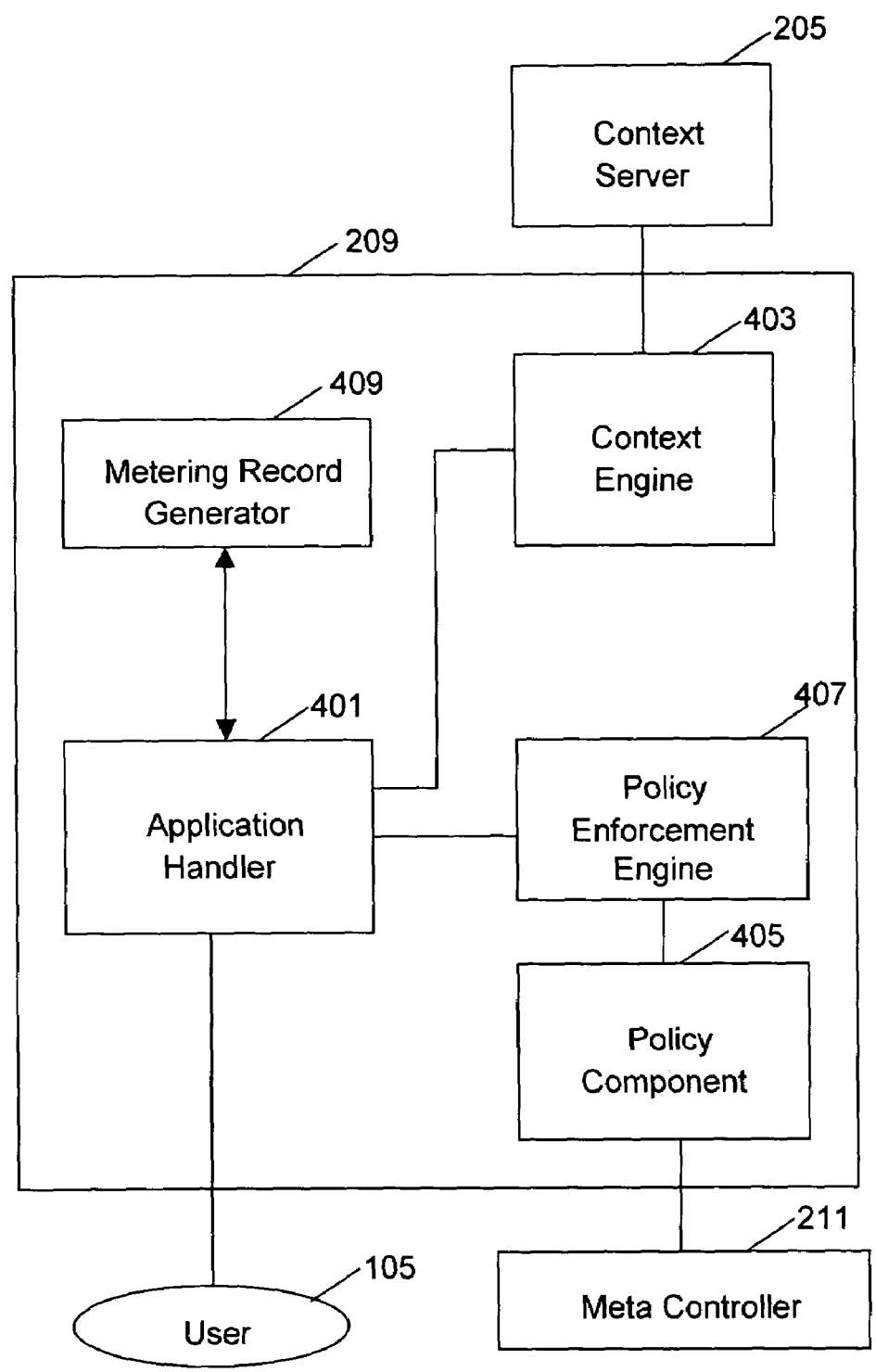
FIG. 4 is a block diagram that describes an Intermediation Gateway in accordance with a preferred embodiment of the present invention.

FIG. 4 is a block diagram that describes Intermediation Gateway 209 in accordance with a preferred embodiment of the present invention. Intermediation Gateway 209 consists of protocol specific Application Handlers 401 [e.g. HTTP, MAIL, STREAMING]. Intermediation Gateway 209 intercepts the user 105 service requests [e.g. internet access] and directs them to the appropriate Application Handler 401. Application Handler 401 based on the policies for user 105, allows access to the Internet. If user 105 has not subscribed for the service and tries to access, Application Handler 401 will send a notification to user 105 informing user 105 of the absence of subscription to requested service. For different kind of service requests there are different Application Handlers 401. Therefore, there would be a separate Application Handler for HTTP requests and for a streaming request.

Meta Controller 211, based on the current context maintained in Context Server 205, decides policies that are to be imposed on the system so as to enable efficient delivery of service requested by user 105. Depending on the policies, a service can be denied or allowed to a user by Intermediation Gateway 209. Context Engine 403 module inside Intermediation Gateway 209 caches recently used context information. This eliminates the need to query for user context from Context Server 205. These policies are extracted by a Policy Component 405 and sent to a Policy Enforcement Engine 407 for the enforcement of policies on the application implementing the service. The functions of Policy Component 405 and Policy Enforcement Engine 407 are explained later in greater detail. A Metering Record Generator 409 keeps storing usage information. It then uses this information to measure the service usage and thus, produce consolidated bills corresponding to a user. Intermediation Gateway 209 notifies these consolidated bills for delivered services to users at regular intervals. All the processing by components of Intermediation Gateway 209, namely Application Handlers 401, Context Engine 403, Policy Component 405 and Policy Enforcement Engine 407, takes place, at run time, during service delivery. In other words, the processing for service realization starts as soon as the request for a service is received from user 105.

Meta Controller 211 helps in controlling all system components by evaluating policies, which in turn are used for controlling the different components. Meta Controller 211 has Execution Engine 213 that helps in deciding policies and rights based on the information extracted from Context Server 205 and Meta Directory 203. The extracted information includes user information that can be obtained from Subscriber Profile 301 and user device information that is derived from Device Profile 309. Context Server 205 provides current information about user 105 (e.g. location), application preference (e.g. HTTP) and state (e.g. connected, disconnected, authenticated) vis-à-vis mobile service provider's network infrastructure.

All the information collected from Meta Directory 203 and Context server 205 is then used to fill in subscription parameters in the service definition extracted from Service Directory 313. Execution Engine 213, on the basis of these filled in parameters, decides the policies and rights that need to be implemented on the system. These policies and rights correspond to control of network infrastructure and resources of mobile service provider 101 (e.g. Access control, QoS). The policies are implemented on various network elements through interfaces using Common Open Policy Service (COPS) or a TCP/IP or UDP socket. Policies and rights corresponding to control of applications are carried out through interfaces with Intermediation Gateway 209.

Figure 5:
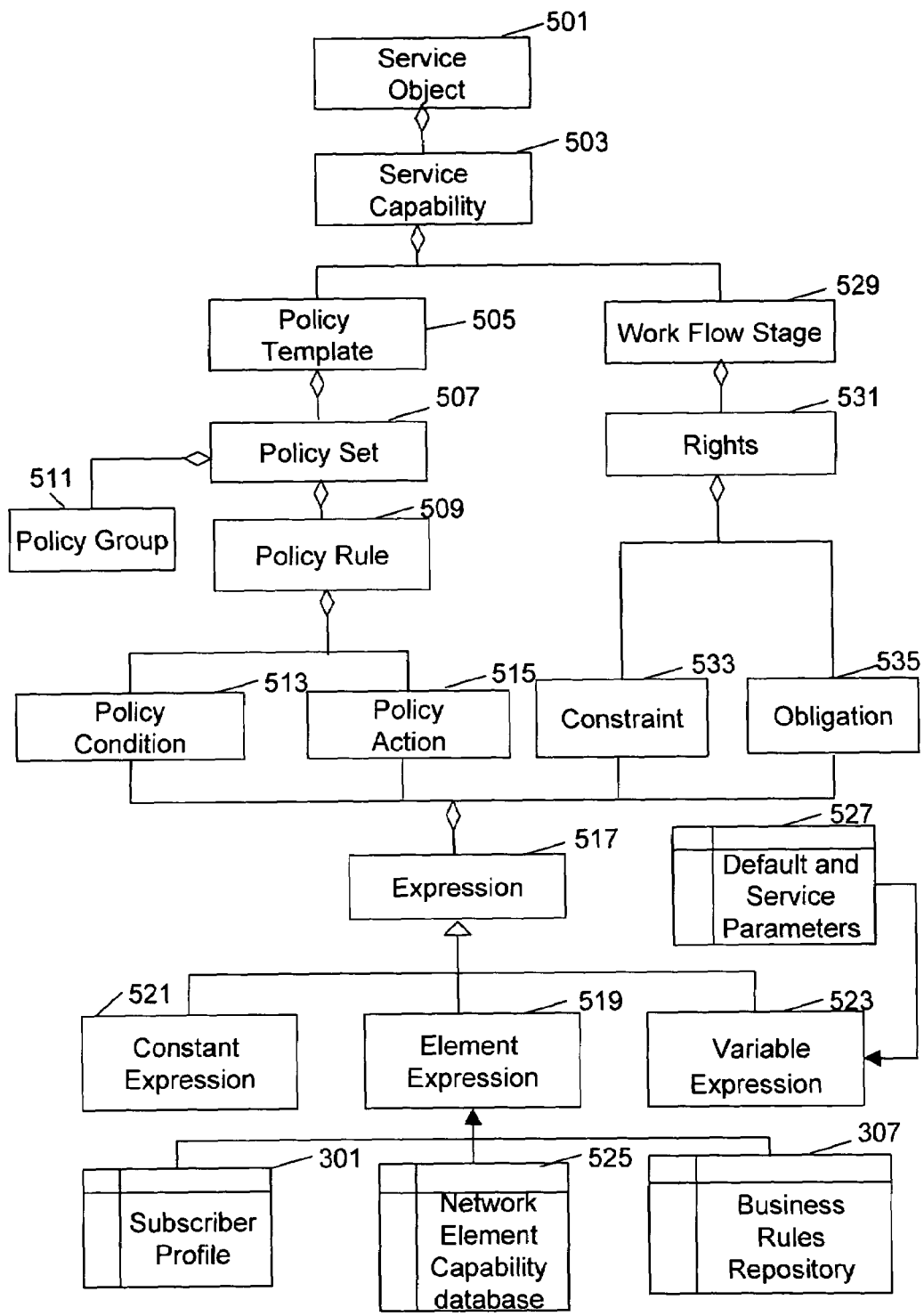
FIG. 5 shows the model used for designing the objects used for service creation.

FIG. 5 is a UML diagram shows the model used for designing a Service Object 501 used for service creation. Mobile service provider 101 creates Service Objects 501 by grouping Service Capabilities 503 based on operator 101's business-level relation with third party 103. Operator 101 also defines a Service Capability 503, which is a logical entity formed by aggregating Policy Templates 505 and Work Flow Stages 529. Based on the capabilities and functionalities offered by system components and mobile service provider 101's network as a whole, Service Capability 503 is defined by mobile service provider 101. Some examples for Service Capabilities 503 that exist in a mobile service provider's network are as follows:

1. Intermediation Capability enables mobile service provider 101 to interact within a session. The session could be for a subscriber initiated access or an application initiated messaging. The intermediation capabilities could be denying access to some content, allowing access to some content, redirecting to an alternate URL and micro payment or prompting for payment or notifying the user cost of content before allowing access to the content. All these capabilities mentioned above have variables for which third party 103 can provide values. For example the variables for redirecting to an alternate URL could be:

| Variable Name | Variable Value |
| --- | --- |
| Redirect URL | |
| URL Description | |

Default Values for Variables for Micro Payment Capability

| Variable Name | Variable Value |
| --- | --- |
| Currency Code | USD |
| Prompt Price | |

2. Relevance Capability enables control access to a service by mobile service provider 101 by targeting it to a particular group. The basis for controlling could be parameters such as gender, device type or age.
3. Context Capability is based on parameters such as the user terminal capabilities, user profile and user location. When mobile service provider 101 is delivering a service to user 105, the context information can be shared with third party 103 and using this information services can be created.

4. Licensing Capability enables digital rights management (DRM). DRM capabilities include usage rights of content after it has been downloaded onto a device. For example a right could be free preview before buying. One of the variables for free preview capability can be FreePreviewCount. Third party 103 fills the value of FreePreviewCount while creating a service based on DRM. Third party 103, using the Business Gateway 201 GUI, may supply a value '3' for FreePreviewCount. This means that user 105 can preview the content three times only. After the content has been viewed by user 105 three times, user 105 may be prompted with a payment prompt.

Mobile service provider 101, while associating Policy Templates 505 to create Service Capability 503, can provide default values that cannot be overridden by third party 103. This enables mobile service provider 101 to have greater control in service creation. In the above example, mobile service provider 101 has set the Currency Code to USD. Third party 103 cannot change Currency Code at the time of service creation.

Various Service Capabilities 503, as defined in the above example, can be combined to form Service Object 501. An example of Service Object 501 using the above-defined Service Capabilities 503 for creation of a service is, "Free Preview for Java Downloads on Java Phones". The operator 101 while creating Service Object 501 can use some or all the Service Capabilities 503 defined above. For creating such a service from this Service Object 501, mobile service provider 101 can enable some features of Service Capabilities 503 like terminal capabilities and free preview before buying. In this manner, by enabling different features of Service Capabilities 503, mobile service provider 101 can create various services. These Service Objects 501 created by mobile service provider 101 are stored in Meta Directory 203. Both third party 103 and mobile service provider 101 are involved in the service creation process.

Once a business relationship with third party 103 is defined, mobile service provider 101 registers third party 103. Registration of third party 103 is a one-time process. On registration, mobile service provider 101 gives third party 103 a user name and password, and also defines Service Objects 501 that third party 103 can access. During registration, the authentication type for a secure communication channel between mobile service provider 101 and third party 103 is also defined based on the business agreement.

Policy templates 505, that aggregate to form Service Capability 503, are defined by Policy Set 507. Policy Template 505 is an extension of the Common Information Model (CIM), which is well known in the art. CIM defines the policy structure. According to the model, the policy structure in the present invention, includes the following:
1. Policy Structure is composed of:
   a. "Policy Set" which incorporates the logical flow
   b. "Policy Conditions" which incorporates the conditional logic
   c. "Policy Actions" which incorporates the operational logic
   d. "Variables" in "Policy Templates" which incorporates the placeholders for external logic/data
   e. "Service capabilities" which incorporates the different capabilities that a service can possess
   f. "Service Objects" for business definition of service capabilities
2. Conditional and Operational logic flow
3. Runtime environment for policy evaluation and execution Policy Set 507 includes a set of Policy Rules 509 and Policy Group 511. Policy Set 507 may comprise of one or more Policy Sets 507. Each Policy Rule 509 comprises Policy Conditions 513 for conditional logic and Policy Actions 515 for operational logic. Zero or more Policy Conditions 513 and Policy Actions 515 define policy Rule 509. Each Policy Condition 513 is associated with one or more Policy Actions 515. If the Policy Condition 513 is satisfied, corresponding Policy Actions 515 are executed. Policy evaluation and execution has been extended by modeling expressions and operations that form Policy Conditions 513 and Policy Actions 515. Policy Conditions 513 and Policy Actions 515 are in the form of Expressions 517. Expression 517 may be an element expression 519, a constant expression 521 or a variable expression 523. Element expression 519 provides a mapping between user context information, the network capability requirements of user 105 and the business rules defined by mobile service provider 101 on the basis of relationships with third party 103. Element expression 519 is evaluated with the help of subscriber profile 301, a Network Element Capability Database 525 and Business Rules Repository 307. Element expression 519 changes if there are any changes in databases 301, 525 and 307. These databases have been described earlier in conjunction with FIG. 4. Constant Expression 521 is not affected by dynamic changes occurring in the system. Some examples of Constant Expression 521 can be device capability information and locations where a particular service can be provided. Other examples include a number or a string, or a regular expression (such as wild card expressions like "all URLs starting with www.julysystems.com". Variable expression 523, on the other hand, depends upon Default And Service Parameters 527 associated with a service, as defined by mobile service provider 101. These expressions are used for defining parameters during service creation. Some examples of Variable expression information can be change in location of user, and change in time (useful when a service has to be offered for a given time period only). The policy model as described above is object oriented and has several classes for services, templates, policies, conditions, actions, operations and expressions.

Service Capabilities 503 in addition to a combination of one or more Policy Templates 505 can also be a combination of one or more Workflow Stages 529 or any other execution flow units. A workflow defines the sequence of execution of various Workflow Stages 529 during the delivery of a service. All execution flows eventually depend on expressions as already explained. Workflow Stage 529 is a combination of Rights 531. Rights 531 are a combination of zero or more Constraints 533 and Obligations 535. Meta Controller 211 tracks the state of the workflow and executes each workflow based on prevailing conditions obtained from Context Server 205. When Workflow Stage 529 expires after some time period, set by third party 103, the next Workflow Stage 529 is obtained from the workflow by Meta Controller 211. The definitions of the Work Flow Stages 529 formed by operator 101 are stored in the Meta Directory 203.

One example of Rights 531 used to develop Work Flow Stage 529 is DRM Rights, as already explained in context of Licensing Capabilities. Combining DRM Constraints and DRM Obligations forms these DRM Rights. A DRM Constraint consists of parameters like count and interval. DRM Constraint 533 restricts the number of times a digital content can be accessed when the corresponding DRM Obligation is satisfied. The number of times digital content can be accessed is given by the count parameter of Digital Constraint. The interval parameter specifies the duration for which the digital content can be used. For example a song can be listened to for a week before the license expires if the interval parameter is set to one week. DRM Obligation defines the requirement for accessing the given digital content. Requirement, in context of the current example, for access can be payment for the digital content to be accessed. An example of DRM Obligation can be payment of $2 to buy the song for unlimited usage.

Some examples of DRM Rights with their corresponding constraints and obligations are given as follows:
1. DRM Right: Rights to use for 2 times for free.
   DRM Constraint: Use allowed for 2 times.
   DRM Obligation: None
2. DRM Right: Rights to use for 5 times for a payment of $1.
   DRM Constraint: Use allowed for 5 times.
   DRM Obligation: $1
3. DRM Right: Rights to use for unlimited number of times for $5.
   DRM Constraint: Use allowed for unlimited number of times.
   DRM Obligation: $5

Meta Controller 211 is responsible for implementation of workflows, policies and other execution flows corresponding to a Service Object 501 being offered through operator 101's network. This implementation by Meta Controller 211 is done considering the network and user status while the service is being delivered over the network.

Execution Engine 213 has both workflow function and policy function. These functions enable Execution Engine 213 to carry out the workflows and policies during service delivery.

Figure 6:
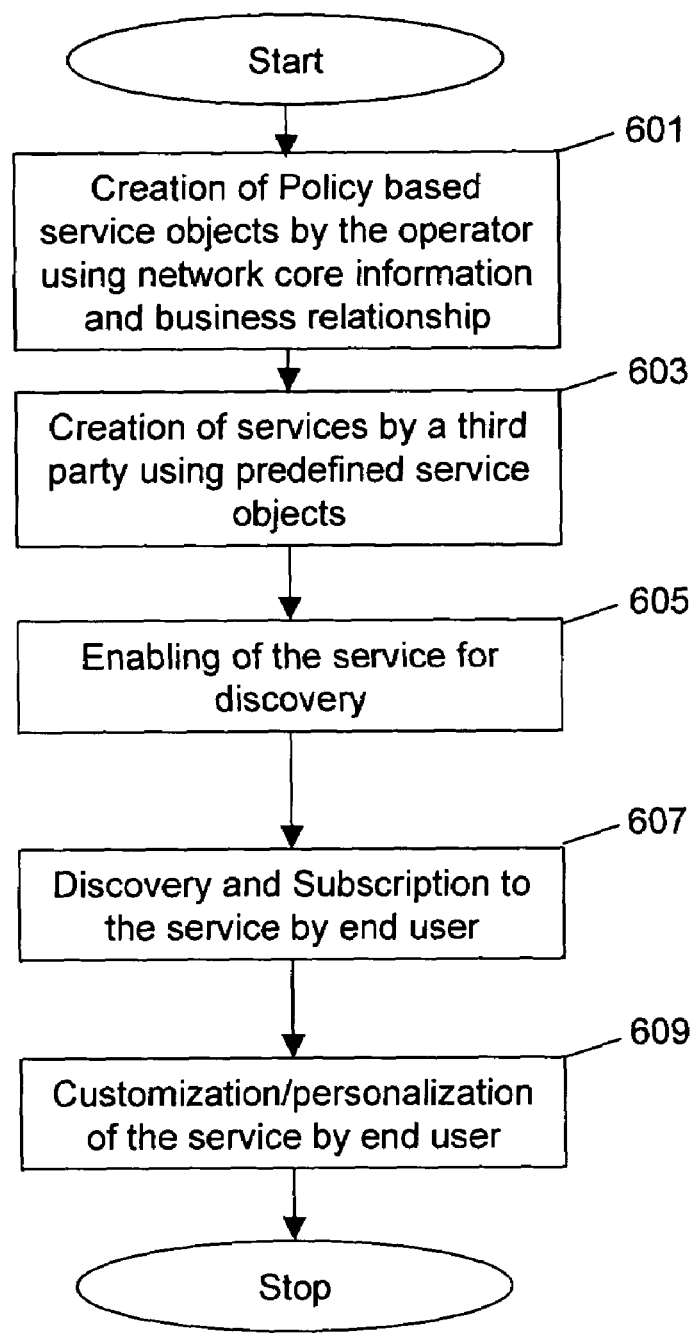
FIG. 6 shows a flowchart corresponding to the steps that are followed for service creation and delivery in accordance with a preferred embodiment of the present invention.

FIG. 6 shows a flowchart corresponding to the steps that are followed for service creation and delivery in accordance with a preferred embodiment of the present invention. At step 601, policy-based Service Objects 501 are created by mobile service provider 101. Mobile service provider 101 uses network core information, service capability features and business relationship with third party 103 in this step. The network core information includes network capability of the telecom operator, infrastructure, application enabling services, user context of the subscriber as well as the attributes of the device owned by the subscribers to access the service. These Service Objects 501 are created using the policy model as already explained in FIG. 5. The policy rules, rights and business rules required for Service Object 501 creation are accessed from Policy Repository 303 and Business Rules Repository 307. Service Object 501 defined by mobile service provider 101 includes one or more variables as described in the various Service Capabilities 503. Mobile service provider 101 also provides the conditions and actions that can be implemented with a service. Service Object 501 thus created is stored in Meta directory 203.

An example of a Service Object 501 would be Java DRM that enables operators to act as an charging and rights management intermediary in delivering licensed J2ME applications to subscribers using different charging mechanisms and different business models with third party java application provider. The service object in this case can consist of Licensing capability, Micro payment capability and relevance capability as previously described.

At step 603, third party 103 creates services using pre defined Service Objects 501. Third party 103 can access these Service Objects 501 stored in Meta directory 203 through Business gateway 201. Third party 103 can access Business Gateway 201 using the username and password assigned at the time of registration. Third party 103 can then select a Service Object 501 from the list of Service Objects 501 available. Recall that Meta Directory 203 stores the Service Objects 501 that have been created by mobile service provider 101 (as described in step 601) in Service Directory 313. Based on selected Service Object 501, Service Capabilities' 503 options are provided to third party 103. In order to create a service, third party 103 specifies values to the variables in Service Object 501. While creating a service, third party 103 has access to Subscriber Profile 301 and Device Profile 309 in Meta directory 203. Third party 103 gives a name and description to Service Object 501. The service thus created by third party 103 is stored in Meta Directory 203 and listed in Service Catalog 207 that is owned by mobile service provider 101.

Thus, at step 603, third party 103 creates services using pre defined Service Objects 501. Predefined templates exist for standard content descriptors like OMA, J2ME and COD. Application Profile 311 contains the descriptors of the types of applications that mobile service provider wants to offer. Some examples of descriptors are as described below:
1. A J2ME application descriptor typically contains the following attributes:
   MIDlet-Name
   MIDlet-Version
   MIDlet-Vendor
   MIDlet-Jar-URL
   MIDlet-Jar-Size
2. OMA Download Descriptor typically contains the following attributes:
   targetNamespace="http://www.openmobilealliance.org/xmins/dd"
   simpleType name="URI"
   restriction base="anyURI"
   maxLength value="128"
   name type="dd:ShortString"
   objectURI"type="dd:URI"
   size"type="xsd:positiveInteger"
   type"type="dd:ShortString"
   vendor"type="dd:ShortString"
   description"type="dd:LongString"
   installNotifyURI"type="dd:URI"
   nextURL"type="dd:URI"
   infoURL"type="dd:URI"
   iconURI"type="dd:URI"
   element name="media"

Third party 103 can access these Service Objects 501 stored in Meta directory 203 through Business gateway 201. Third party 103 first logs into the Business Gateway 201 [for example via a GUI interface] and chooses an application type (e.g. Content download, HTTP access, multimedia messaging, Java downloads, Pop mail, alerts, etc.). For example, suppose third party 103 selects a Java DRM service object, to define a service for java downloads; the following variables are filled in:
   MIDlet-Name=
   MIDlet-Version=
   MIDlet-Vendor=
   MIDlet-Jar-URL=
   MIDlet-Jar-Size=

The appropriate descriptor type corresponding to the chosen application gets imported from Meta Directory 203 via Business Gateway 201. For example if user 105 chooses a Java application type then J2ME descriptor gets imported from Meta Directory 203. Recall that Meta Directory 203 stores the Service Objects 501 that have been created by mobile service provider 101 (as described in step 601) in Service Directory 313. In order to create a service, third party 103 sets parameters for the variables in the service object. The variables and variable expressions in a service capability template depend on the content descriptor type in consideration (e.g. URL, Content Version, Description, Size). Third party 103 selects the features (e.g. prompt, allow access) and fill in the appropriate business parameters. Further these policies rules include the following:

1. Prompt
   i. Payment per use
   ii. Alert
   iii. Location of the user
2. Allow access
   i. Based on device type owned by the user
   ii. Time of day
   iii. Location of the user The service thus created by third party 103 is stored in Meta Directory 203. Third party 103 also defines the relevance criteria (e.g. games download service available only for people in the age group between 13–20) for a service, thus created. These relevance criteria are stored in the Service Catalog 207.

Proceeding with the example of Java DRM described in conjunction with the explanation of FIG. 5, third party 103 can provide the number of free previews allowed and price for the java download. Hence, third party 103 would provide values to the variables such as "freepreviewcount", "price". Third party 103 can also leave some of the variables free for the user to overwrite.

At step 605, the provision of created service to user 105 is enabled. This is done by integration of the created service with the existing network infrastructure. Service gets defined in Meta directory 203 and Service Catalog 207. Service Catalog 207 can discover the service. Meta controller 211 can perform policy evaluation for the service, when the service is invoked. The created service is thus added to a list of existing services (that are already being provided to user 105).

At step 607, user 105 subscribes to the integrated service. Service Catalog 207 carries out a match between the service relevance criteria and the user context as accessed from Context Server 205. Third party 103 that creates the service defines relevance criteria for a service. The relevance criterion of a service defines the availability of the service to users 105 based on the user context. In the example mentioned above, the relevance criterion for the service may be defined by the age of the user. The service Java DRM will be relevant only to users above 25 yrs old. On the basis of the relevance criterion match, the user is provided with a list of services that match user criteria, and hence are relevant to the user. At step 609, user 105 can customize the service subscribed or used, by overwriting variables.

Figure 7:
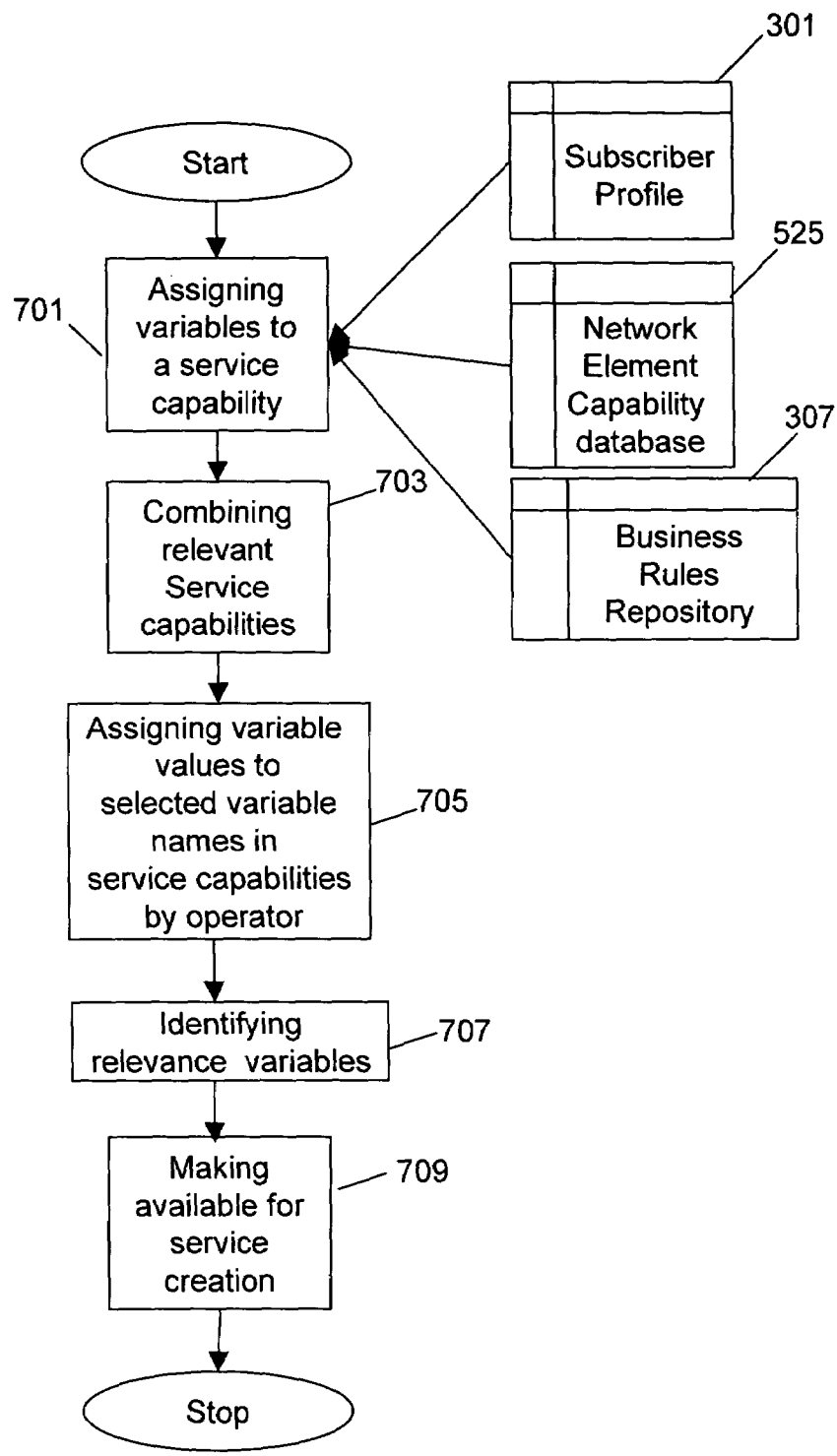
FIG. 7 illustrates the steps involved in the creation of a service object by a mobile service provider.

FIG. 7 elaborates on the steps involved in the creation of Service Object 501 by mobile service provider 101 (as described in step 601 in FIG. 6). At step 701, mobile service provider 101 assigns variables relevant to a Service Capability 503 that needs to be created. While specifying the variables attached to the template, mobile service provider 101 also has an access to Subscriber Profile 301, a Network Element Capability Database 525 and Business Rules Repository 307. At step 703, mobile service provider 101 combines all Service Capabilities 503 that are required to define Service Object 501. After the Service Object 501 has been created, at step 705, mobile service provider 101 assigns values to some variable names in Service Capabilities 503. Third party 103 cannot change the values that have been assigned to the variables. At Step 707, mobile service provider 101 chooses all relevant policies and rules needed for creation of Service Object 501 in accordance with business relationships with third parties 103. These created Service Objects 501 are stored in Meta Directory 203 by mobile service provider 101. These templates are now made available for creating services by third party 103 at step 709.

Figure 8:
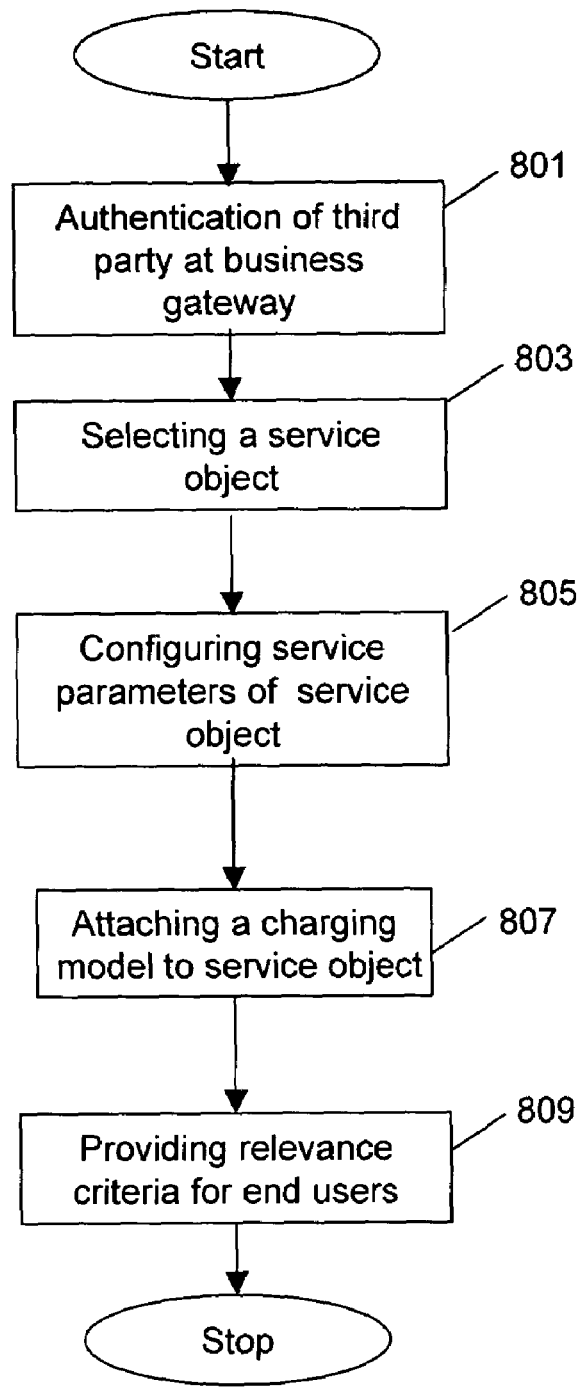
FIG. 8 illustrates the steps involved in the creation of a service by a third party.

FIG. 8 elaborates on the steps involved in the creation of a service by third party 103 using predefined Service Objects 501 (as described in step 603 in FIG. 6). At step 801, third party 103 accesses Service Objects 501 through authentication at the business gateway 201. For authentication, third party 103 uses the username and password that had been assigned at the time of registration with mobile service provider 101. At step 803, third party 103 selects one Service Object 501 from the accessible objects stored in Service Directory 313. At step 805, third party 103 configures the service parameters of Service Object 501. In other words, third party 103 provides values to the variables of the parameter according to the service needs. The extent of access is defined by business relationships existing between mobile service provider 101 and third party 103. At step 807, third party 103 defines a charging model corresponding to the created service. Service Object 501 has a number of charging models incorporated in it and third party 103 can choose from any one of them while creating the service. Charging models define the manner in which billing of a service is carried out. Charging models can be of various kinds like pay per use, pay per duration, pay per event and the like. For example in the pay per use charging model, mobile service provider charges the subscriber for every usage session of the service irrespective of the length of the session or volume of data transported. Third party 103 chooses any one of these charging models attached to Service Object 501 for creating a service. At step 809, third party 103 provides the relevance criteria for the created service. The relevance criterion specifies the profile that a user should possess in order to avail of the service. Each service is provided with zero or more relevance criterion. The services with no relevance criterion specified are available to all the users. Free e-mail services provided by a host of websites over the Internet are an example of services with no relevance criterion. These services are available to any user who wants to subscribe to it.

Figure 9:
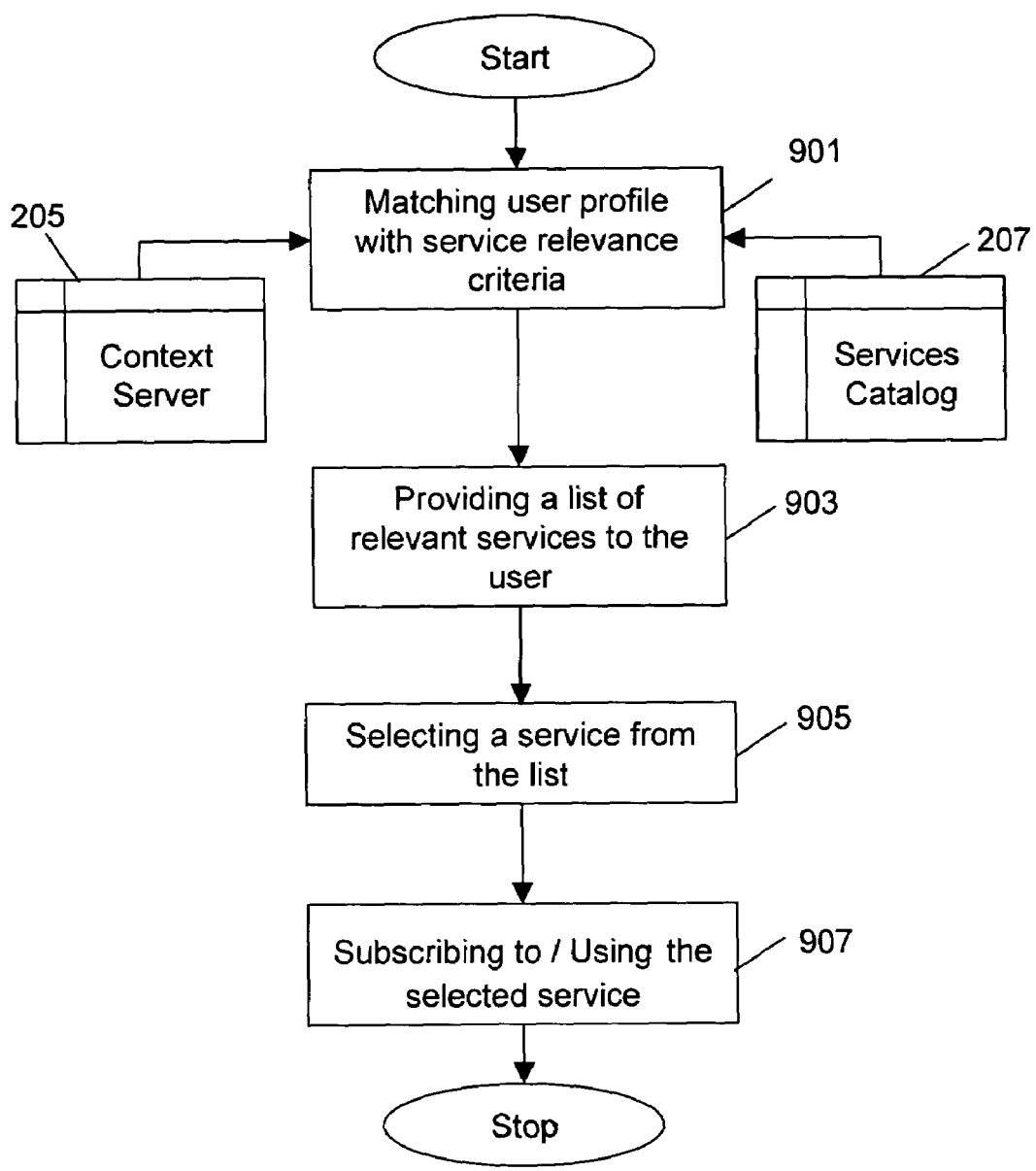
FIG. 9 illustrates the steps involved in the subscription of a service by a user.

FIG. 9 elaborates on the steps involved in the subscription or usage of a service by user 105 (as described in step 607 in FIG. 9). At step 901, the user context is matched with the relevance criteria of the services available with mobile service provider 101. The relevance criterion of the services is accessed from the service Catalog 207 and the user context is obtained from Context Server 205. The matching of relevance criterion and the user context is carried out at Service Catalog 207. At step 903, a list of most relevant services is provided to user 105. The list contains those services, which have at least one of its relevance criteria satisfied by a parameter in the user context. Continuing with the example above, the service of free Internet access, if third party 103 provides location as an overwriting variable, user 105 may specify in the Service Object 501, the location from which user 105 would like to have free access. The services may be listed in an order of relevance. At step 905, user 105 selects from the list of available services, the service of choice. This process is carried out at Intermediation Gateway 209. Intermediation Gateway 209 provides the function of service delivery to user 105. At step 907, user 105 may subscribe to a service, such as email access service, or use a service, such as JAVA download service.

In an alternate embodiment, the idea of service creation and delivery may also be applied to wireline networks. The user context information, in this embodiment, will be less than that in wireless networks. Information relating to user location, device capabilities, etc. may not be included in certain cases.

To summarize, in a preferred embodiment of the invention, the mobile service providers offer services to mobile users. The service is provided in collaboration with the third party as well as the mobile users. For the purpose of creating services, a Service Policy Model is developed. The Service Policy Model defines a service framework to represent the business level relationship between the third party provider and users of the mobile service provider's network infrastructure. It defines a business solution as a set of "service capabilities", which in turn are in the form of service objects, for fulfillment of multiple application-level relationships. In an alternative embodiment, the present invention could be used to provide services to users over wired networks too.

The heretofore-described invention has numerous advantages. The invention enables mobile service providers and third parties to work collaboratively for creation and delivery of services. This enables mobile service providers to profitably share their core network information (such as subscriber profiles, subscriber billing relationship, etc.). Furthermore, the invention also enables the mobile service providers to have an increased amount of involvement in the types of services that they provide to users rather than be a passive bit pipe for access only.

Another advantage of the invention is rapid and easy creation of services by mobile service providers and third parties. The policy service model is flexible to support all current and emerging business models and charging models. This is due to the structured CIM model being used for creating service objects. The policy service model can combine the capabilities of the mobile service provider's network to deliver cross channel services. This is possible due to availability of different Application Handlers for different types of service requests like HTTP, Messaging and the like. (For example: There are two channels, one for HTTP requests and the other for Messaging. A mobile user requests for a ring tone on his mobile through the HTTP channel. As a reply to this request, the Messaging channel is used to send the requested ring tone on the mobile of the user as an SMS). Yet another advantage of the invention is its ability to allow the operator to control applications during service delivery. Another significant advantage that the present invention offers is a high degree of customizability. The third parties (partners) can customize their services as per the user's profiles while creating the services. The invention also provides for relevance based service discovery in which user 105 is provided only with services that are relevant to him/her. Users 105 subscribe to these services. Also, users 105 get a consolidated billing for the services availed unlike in conventional systems (wherein user had different billings for different services availed).

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for providing at least one service to a plurality of mobile users, the service being provided via a network infrastructure owned by a mobile service provider, the service being provided by at least one third party partnering the mobile service provider, the method comprising the steps of:
    a. creating policy based service objects using core network information, service capability features, and the business relationship with the third party, the policy based service objects being created by the mobile service provider, the service objects once created being made available to the third party for service creation;
    b. the mobile service provider providing a list of created service objects to the third party.
    c. creating services using at least one of the created service objects, the services being created by the third party, and the service being added to a list of services, wherein the third party customizes the services as per subscriber profiles by specifying values to variables in the service object, the subscriber profiles including information about the plurality of mobile users;
    d. providing the list of services to the mobile user via the network infrastructure upon intercepting a request for the service from the mobile user, wherein the list of services is relevant to the mobile user, the list of services being provided by the mobile service provider;
    e. the mobile user subscribing to a service from the list of services being provided by the mobile service provider; and
    f. the mobile user customizing the subscribed service by overwriting at least one variable, the variables defining the subscribed service.

2. The method as recited in claim 1, wherein the step of creating services using at least one of the created service objects includes selecting a charging model for a service from a number of charging models associated with the service object.

3. The method as recited in claim 1, wherein the step of creating a service by a third party comprises the step of:
    a. entering authentication information for access to service objects available with the mobile service provider, the authentication enabling the third party to gain pre-defined access to service objects;
    b. selecting at least one service object;
    c. configuring service parameters on the selected service objects on the basis of predefined business relationships existing between the third party and the mobile service provider; and
    d. providing relevance criteria for the created service on the basis of the shared core network information.

4. The method as recited in claim 3, wherein the step of configuring service parameters on the basis of predefined business relationships existing between the third party and the mobile service provider comprises the steps of:
    a. using the core network information that is being shared between the mobile service provider and the third party, the shared core network information being defined on the basis of the pre-defined business relationships; and
    b. providing value added services in accordance with the predefined business relationship.

5. The method as recited in claim 1, wherein the step of creating services using at least one of the predefined service objects is carried out by the mobile service provider.

6. The method as recited in claim 1, wherein the step of enabling the provision of the created service to the mobile user comprises the steps of:
   a. applying network level controls on the service created in accordance with business relationships;
   b. applying application level controls on the service created in accordance with business relationships; and
   c. applying system level controls on the system elements participating in service creation and delivery.

7. The method as recited in claim 1, wherein the step of a user subscribing to a service comprises the steps of:
   a. the mobile service provider matching user context information with relevance criteria of services offered;
   b. the mobile service provider providing to the user, a list of available services whose relevance criteria matches with the user information;
   c. the user selecting from the list, at least one service; and
   d. the user subscribing to the selected service.

8. The method as recited in claim 1, further including the step of the mobile user customizing the service as per preference by means of the steps of:
   a. the user identifying the service parameters to be customized; and
   b. the user overwriting the identified service parameters.

9. The method as recited in claim 1, wherein the step of creating policy based service objects comprises the steps of:
   a. assigning variables relevant to a service capability based on subscriber profiles, a network element capability database, and business rules relationships between the mobile service provider and the third party;
   b. combining service capabilities to create a service object;
   c. assigning values to variable in the service capabilities of the created service object;
   d. selecting relevant policies and rules for the created service object based on the business relationships with the third parties; and
   e. storing the created service object, wherein the stored service object is available for creating services by the third parties.

10. The method as recited in claim 9, wherein the step of assigning variables relevant to a service capability based on a network element capability database for creating service objects comprises the steps of:
    a. defining network elements information including information relating to the capability of network elements; and
    b. defining the gateway services information including information relating to the capability of gateway services.

11. The method as recited in claim 1, wherein the step of creating policy based service objects comprises providing conditions and actions for the service object that can be implemented with a service.

12. The method as recited in claim 1, wherein the step of providing the list of service objects to the third party by the mobile service provider comprises providing only authorized features to the third party for service creation.

13. The method as recited in claim 1, wherein the service objects are available through graphical user interface to the third party for service creation.

14. A system suitable for providing at least one service to a plurality of mobile users, the service being provided via a network infrastructure owned by a mobile service provider, the service being provided by at least one third party partnering the mobile service provider, the system comprising:
    a. a business gateway for enabling the provision and modification of core network information by the mobile service provider and the third party;
    b. a context server for maintaining information about the system, wherein the context server comprises:
        i. means for collecting status information about the user;
        ii. means for collecting status information about user devices;
        iii. means for collecting status information about network elements; and
        iv. means for collecting status information about applications enabling services;
    c. a meta directory for storing the core network information, the core network information being needed for creation and delivery of services;
    d. a service catalog for storing a list of available services, and the relevance criteria corresponding to each service;
    e. an intermediation gateway for enabling the delivery of services; and
    f. a meta controller for providing a policy based control of the business gateway, the context server, the meta directory, the service catalog and the intermediation gateway.

15. The system as recited in claim 14, wherein the business gateway authenticates third party for access to information available with the mobile service provider, and wherein the business gateway comprises:
    a. a read module for reading the core network information stored in the meta directory, the information being read by the mobile service provider and the third party; and
    b. a write module for providing core network information that is to be stored in the meta directory, the information being provided by the mobile service provider and the third party.

16. The system as recited in claim 14, wherein the meta directory comprises:
    a. a service directory for storing service objects created by the mobile service provider;
    b. a policy repository for storing policy rules created by the mobile service provider;
    c. a business rules repository for storing rules decided on the basis of business relationships between the mobile service provider and third party;
    d. a device profile database for storing details of user devices;
    e. an application profile for storing details of the different applications that implement services; and
    f. a subscriber profile for storing information about users subscribed for various services.

17. The system as recited in claim 14, wherein the intermediation gateway comprises:
    a. a context engine receiving context information from the context server;
    b. a policy component extracting policies relevant to a service from the meta controller;
    c. an application handler deciding the appropriate application corresponding to a service requested by the user; and
    d. a policy enforcement engine implementing policies extracted by the policy component on the application.

18. The system as recited in claim 17, wherein the system further comprises a metering record generator for storing usage information, the usage information being used to obtain consolidated billing for the users.

19. The system as recited in claim 14, wherein the meta controller comprises:
  a. a policy decision engine for identifying policies corresponding to a requested service;
  b. a network resource control module for policy based control of network infrastructure;
  c. an application control module for policy based control of application implementing a requested service; and
  d. a system resource control module for policy based control of system elements.

20. The system as recited in claim 19, wherein the policy decision engine authenticates the user requesting for a service.

21. The system as recited in claim 14, wherein the service catalog comprises:
  a. means for extracting user information from the context server;
  b. means for extracting relevance criteria for all the services stored in the service catalog; and
  c. means for matching user context with relevance criteria for each service.

22. A system suitable for providing at least one service to a plurality of mobile users, the service being provided via a network infrastructure owned by a mobile service provider, the service being provided by at least one third party partnering the mobile service provider, the system comprising:
  a. a business gateway for enabling the provision and modification of core network information by the mobile service provider and the third party;
  b. a context server for maintaining information about the system;
  c. a meta directory for storing the core network information, the core network information being needed for creation and delivery of services, wherein the meta directory comprises:
    i. a service directory for storing service objects created by the mobile service provider;
    ii. a policy repository for storing policy rules created by the mobile service provider;
    iii. a business rules repository for storing rules decided on the basis of business relationships between the mobile service provider and third party;
    iv. a device profile database for storing details of user devices;
    v. an application profile for storing details of the different applications that implement services; and
    vi. a subscriber profile for storing information about users subscribed for various services;
  d. a service catalog for storing a list of available services, and the relevance criteria corresponding to each service;
  e. an intermediation gateway for enabling the delivery of services; and
  f. a meta controller for providing a policy based control of the business gateway, the context server, the meta directory, the service catalog and the intermediation gateway.

* * * * *